(12) United States Patent
Hsu

(10) Patent No.: US 6,460,673 B2
(45) Date of Patent: Oct. 8, 2002

(54) FREEWHEEL HUB FOR A BICYCLE

(76) Inventor: Yi-Hsung Hsu, No. 51, Hai-Shan-Chung St., Hai-Hu Village, Lu-Chu Hsiang, Taoyuan Hsien (TW)

( * ) Notice: Subject to any disclaimer, the term of this patent is extended or adjusted under 35 U.S.C. 154(b) by 18 days.

(21) Appl. No.: 09/731,033

(22) Filed: Dec. 7, 2000

(65) Prior Publication Data

US 2002/0070088 A1 Jun. 13, 2002

(51) Int. Cl.[7] .............................................. F16D 41/24
(52) U.S. Cl. ....................................................... 192/64
(58) Field of Search ..................................... 192/64, 45

(56) References Cited

U.S. PATENT DOCUMENTS

| | | | | |
|---|---|---|---|---|
| 533,912 A | * | 2/1895 | Moise ........................... | 192/64 |
| 2,049,880 A | * | 8/1936 | Winkler ........................ | 192/45 |
| 2,211,548 A | * | 8/1940 | Schwinn ....................... | 192/64 |
| 3,993,178 A | * | 11/1976 | Mendoza-Orozco ......... | 192/46 |
| 5,129,711 A | * | 7/1992 | Chen ............................ | 192/45 |
| 5,547,055 A | * | 8/1996 | Chang et al. ............. | 188/82.84 |
| 5,575,570 A | * | 11/1996 | Uchiyama et al. ......... | 384/470 |
| 5,642,796 A | * | 7/1997 | Tabe ............................ | 192/45 |
| 5,819,898 A | * | 10/1998 | Stark ...................... | 192/113.32 |

FOREIGN PATENT DOCUMENTS

JP       60-125420 A   *   7/1985

* cited by examiner

Primary Examiner—Rodney H. Bonck
(74) Attorney, Agent, or Firm—Rosenberg, Klein & Lee

(57) ABSTRACT

A freewheel assembly (1) for a rear wheel of a bicycle includes a body (10), a sprocket wheel (12) mounted on the body (10), a sleeve (16) sandwiched between the body (10) and the sprocket wheel (12), a plurality of roller bearings (11) fitted between the sleeve (16) and the sprocket wheel (12), a disk clamp (15) fitted to a distal end of the body (10) and clamping the sprocket wheel (12) to the body (10), and pluralities of first and second ball bearings (13, 14) to ensure correct location of the sprocket wheel (12) and roller bearings (11). In a driving mode of the freewheel assembly (1), the roller bearings (11) engage the sprocket wheel (12) to the body (10). In a non-driving mode, the roller bearings (11) separate from sprocket wheel (12) to allow the body (10) to rotate while the sprocket wheel (12) does not rotate.

9 Claims, 7 Drawing Sheets

FREEWHEEL HUB FOR A BICYCLE

BACKGROUND OF THE INVENTION

1. Field of the Invention

The present invention relates to a freewheel hub for a bicycle, and more particularly a freewheel hub for a bicycle with even distribution of input torque and reliable transition between driving and non-driving modes of the freewheel.

2. Description of Related Art

Bicycles are fitted with a freewheel sprocket (70) on a hub (72) of a rear wheel (73), whereby when a transmission chain (74) drives the sprocket (70) clockwise, as seen in FIGS. 6 and 7, the entire rear wheel (73) is turned clockwise. When the bicycle is ridden, the rear wheel (73) is driven by the transmission chain (74), which in turn has been driven by a rider rotating a crank set (76). A rider may often wish to continue in motion on the bicycle without pedaling, such as going downhill. At such a time, the engagement between the sprocket freewheel (70) and the rear wheel hub (72) is released so that the chain (74) and the crank set (76) do not have to move in respect to the rotation of the rear wheel (73). As seen in FIG. 7, a prior art driving engagement between the freewheel sprocket (70) and the rear wheel hub (72) is via two pins (702) received in respective seats (705) and fitted between a core (704) and a collar (706) of the freewheel (70). The collar (706) has a ratchet bore comprising a plurality of alternating inclined faces (707) and shoulders (708). The pins (702) are urged away from their seats (705) by a respective one of two springs (709), whereby the pins (702) abut respective shoulders (708) in the core (704) and thus the entire freewheel sprocket (70) rotates. A bore defined through the core (704) has a threaded interior which threadingly engages with a male thread (not shown) formed on one side of the wheel hub, and thus when the core (704) turns, the rear wheel (73) turns to and vice-versa. However, when the rear wheel turns (73) but the rider does not turn the crank set, the rotating pins (702) slide over the inclined faces (707) of the ratchet bore and are pushed towards their seats (705) as the tension of the springs (709) is overcome. However, the freewheel sprocket as described has the following drawbacks:

(i) the small driving engagement area between the pins and the shoulders is not sufficient when significant torque is transmitted therethrough. For example, if a rider puts considerable force on the engagement due to riding up a steep hill, the pins may fracture due to over-stress, leading to failure of the freewheel sprocket and possible injury to the rider; and (ii) the freewheel sprocket is often lubricated with oil but after a length of time, and especially in cold weather, the oil may in fact become thick and sticky whereby the pins do not release properly from their seats such that the engagement between the core and the collar is eliminated, leading to the bicycle becoming useless until the fault is determined and treated by a mechanic.

Thus, there is a long and unfulfilled need for a freewheel sprocket for a bicycle which provides reliable, even and secure engagement and release of drive input.

SUMMARY OF THE INVENTION

The object of the present invention is to provide a freewheel sprocket for a bicycle in which received torque is reliably and efficiently transmitted to a rear wheel hub on which the freewheel sprocket is mounted.

A further object of the present invention is to provide a freewheel sprocket in which engagement between a body and a sprocket wheel thereof is reliably actuated and released.

The freewheel sprocket of the present invention includes a flanged body, a sprocket wheel with a ratcheted bore and mounted over the body, a sleeve with a corrugated exterior and mounted between the body and the ratcheted bore of the sprocket wheel, a plurality of roller bearings received in the sleeve and evenly-dispersed between the body and the sprocket wheel, a first plurality of ball bearings and a second plurality ball bearings evenly dispersed on respective sides of the roller bearings, and a disk clampingly-retaining the ball and roller bearings in respective desired locations. The rollers move between a first position where they provide a driving mode between the sprocket wheel and the body, and a second position where there is a non-driving mode between the sprocket wheel and the body.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
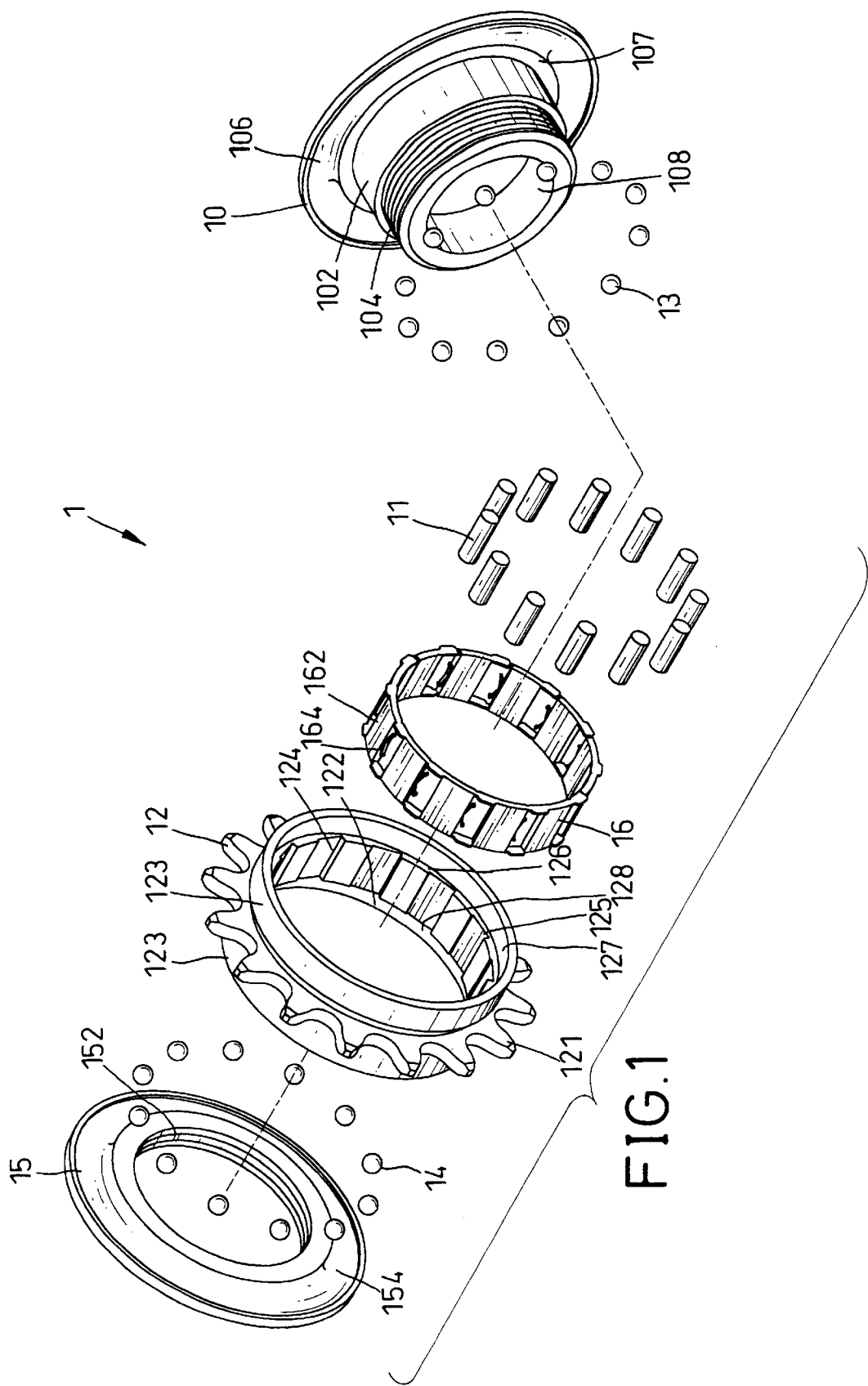
FIG. 1 is an exploded view of a freewheel sprocket for a bicycle in accordance with the present invention.
Figure 2:
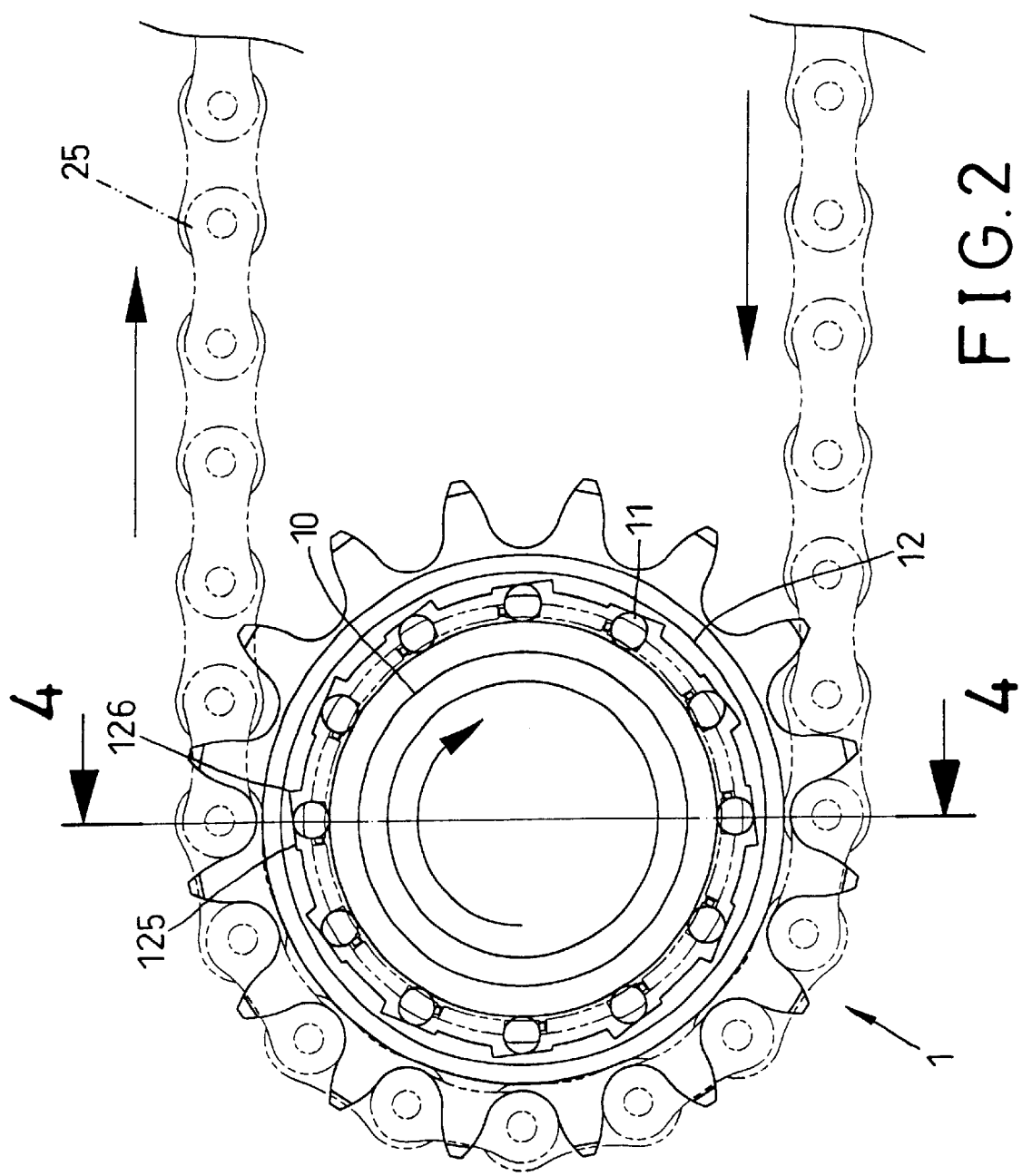
FIG. 2 is a schematic view of the freewheel sprocket for a bicycle as shown in FIG. 1, in a driving mode.

Referring to the figures and especially FIGS. 1 and 2, a freewheel sprocket assembly (1) for a bicycle comprises a flanged body (10), a plurality of roller bearings (11), a sprocket wheel (12), a plurality of first ball bearings (13), a plurality of second ball bearings (14), a disk clamp (15), and a sleeve (16).

The body (10) includes a plain central portion (102), a threaded portion (104) formed at a first end of the central portion (102), and a flange (106) formed at a second end of the central portion (102). A through hole (108) extends through the body (10) and has a threaded end (not shown) defined concentric with the second end of the central portion (102). A radius (107) is formed between a base of the flange (106) and the central portion (102).

The sleeve (16) has defined in an outer periphery thereof a plurality of recesses (162) corresponding to the plurality of roller bearings (11), and the roller bearings (11) are rotatably received in the respective recess (162). Further, a strip spring (164) is formed in a rear edge of each recess (162). Preferably, the sleeve (16) is a single piece of molded plastics, and is rotationally received over the central portion (102) of the body (10).

The sprocket wheel (12) has a toothed center (121) with two plain shoulders (123) being respectively formed at either side of the center (121), and a bore (122) slightly larger than the outer periphery of the sleeve (16). The bore (122) of the sprocket wheel (12) is defined by a periphery formed with a plurality of inclined cut outs (124) corresponding to the plurality of roller bearings (11). Each cut out (124) has a deep front end (125) and a shallow rear end (126). First and second radiussed counter bores (127, 128) are respectively defined at two ends of the bore (122).

The disk clamp (15) includes a threaded bore (152) corresponding to the threaded portion (104) of the body, and a radius (154) formed on an inner face thereof.

Figure 3:
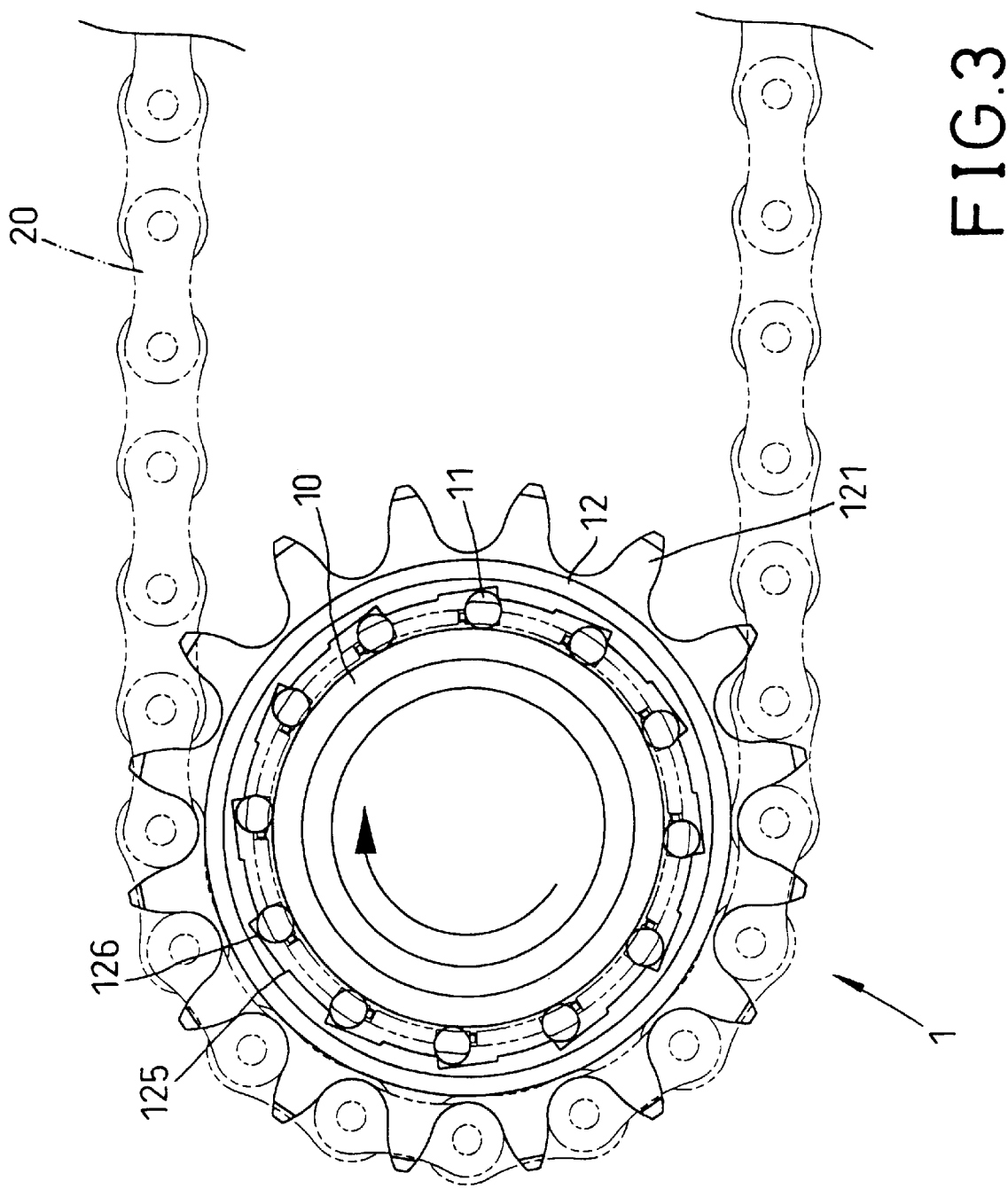
FIG. 3 is a schematic view of the freewheel sprocket for a bicycle as shown in FIG. 1, in a non-driving mode.
Figure 4:
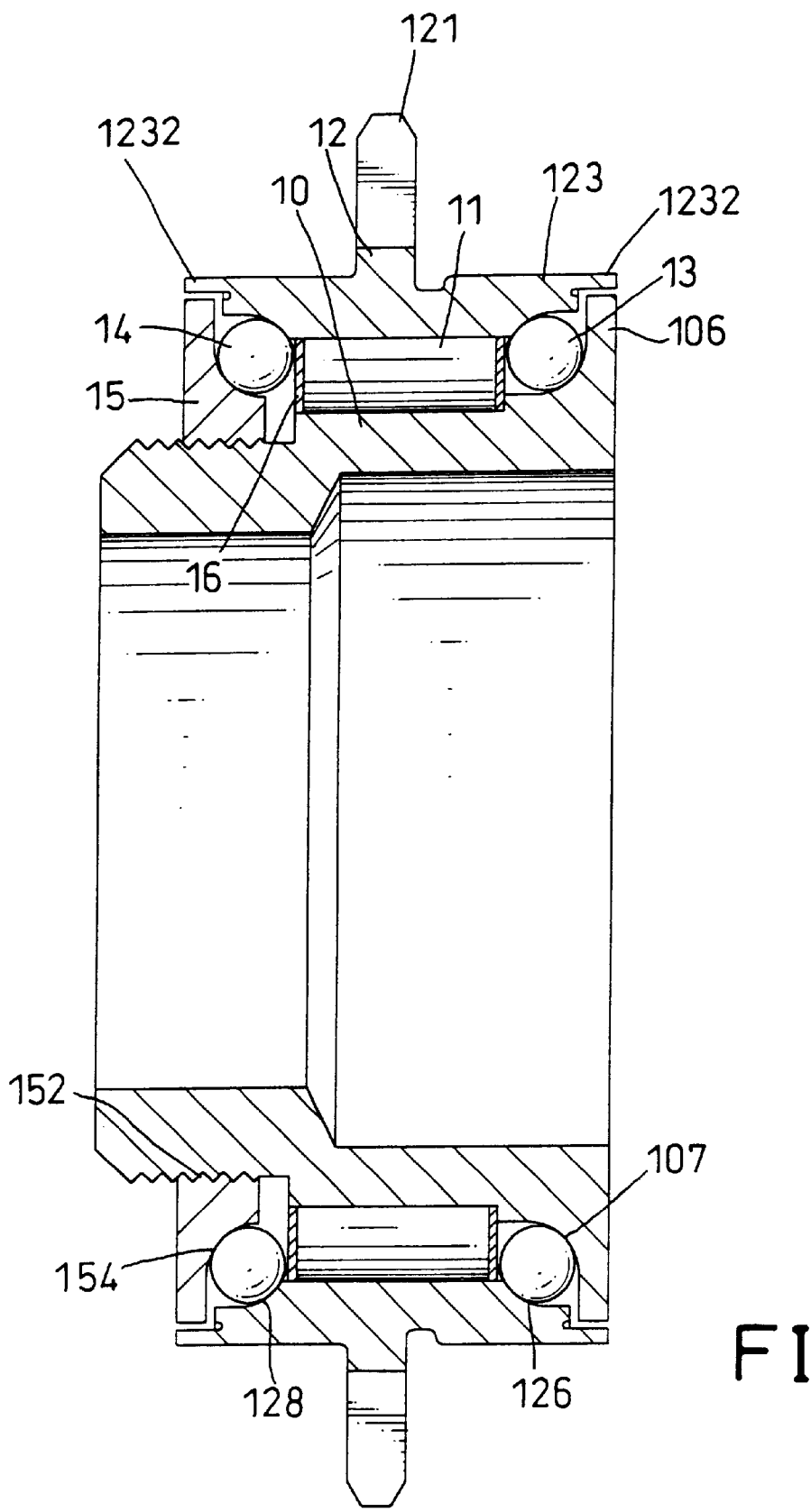
FIG. 4 is a cross-sectional view of a first embodiment of the freewheel sprocket for a bicycle as shown in FIG. 1.

In assembly, referring to FIGS. 1 and 4, the first ball bearings (13) are received on the radius (107) of the body (10), the sleeve (16) is mounted on the central portion (102) of the body (10), the roller bearings (11) are received in the recesses (162) to contact a periphery of the central portion of the body (10), the sprocket wheel (12) is mounted over the body (10) such that the roller bearings (11) are received in a respective one of the cut outs (124), the first ball bearings (13) are sandwiched between the radius (107) and the first radiussed counter bore (127), and the disk clamp (15) is threadingly engaged with the threaded end (104) of the body (10), whereby the second ball bearings (14) are sandwiched between the second radiussed counter bore (128) and the radius (154). The first and second ball bearings (13, 14) ensure that the sprocket wheel (12), the sleeve (16), and the roller bearings (11) remain correctly positioned laterally in respect to the body (10). Referring to FIGS. 2 and 3, a distance between the shallow rear end (126) of each cut out (124) and the periphery of the central portion of the body (10) is smaller than the diameter of each roller bearing (11). A distance between the deep front end (125) of each cut out (124) and the periphery of the central portion of the body (10) is bigger than the diameter of each roller bearing (11). The sprocket assembly (1) is fitted to a rear wheel of a bicycle by threadedly engaging the threaded end of the through hole (108) with a male thread of a hub of the rear wheel. Alternatively, the sprocket assembly (1) may have a cassette form instead of the threaded end etc, but as this is well-known in this field and does not form part of the claimed invention, further description thereof is omitted.

Referring to FIG. 2, in a driving mode of the freewheel sprocket (1), a chain (20) is turned in a direction of the arrows by a rider turning a crank set of the bicycle, whereby the sprocket wheel (12) is turned clockwise and the shallow rear end (126) of each cut out (124) clamps the respective roller bearing (11) to the central portion of the body (10) such that positive engagement is achieved between the sprocket wheel (12) and the body (10).

Referring to FIG. 3, in a non-driving mode of the freewheel sprocket (1), the chain (20) is stationary and thus the sprocket wheel (12) is also stationary, yet the wheel hub is turning clockwise as shown by the arrow and thus the body (10) accordingly is turning. In this mode, the roller bearings (11) are pushed to the deep front ends (125) of the cut outs (124), and thus, there is no driving engagement between the sprocket wheel (12) and the body (10). The strip springs (164) urge the roller bearings (11) toward the deep front ends (125) to ensure the non-driving mode is available when required but tension of the strip springs (164) is overcome by rotation of the body (10).

In a first embodiment of the invention, as shown in FIG. 4, the shoulders (123) each have a thin circumferential step (1232). The flange (106) has an outer diameter slightly smaller than an inner diameter of a respective one of the steps (1232) whereby the periphery of the flange (106) is received therein to provide a first seal against foreign matter reaching the bearings (11, 13, 14) etc. The disk clamp (15) has an outer diameter slightly smaller than an inner diameter of the other step (1232) whereby the periphery of the disk clamp (15) is received therein to provide a second seal against foreign matter entering the bearings (11, 13, 14) etc.

Figure 5:
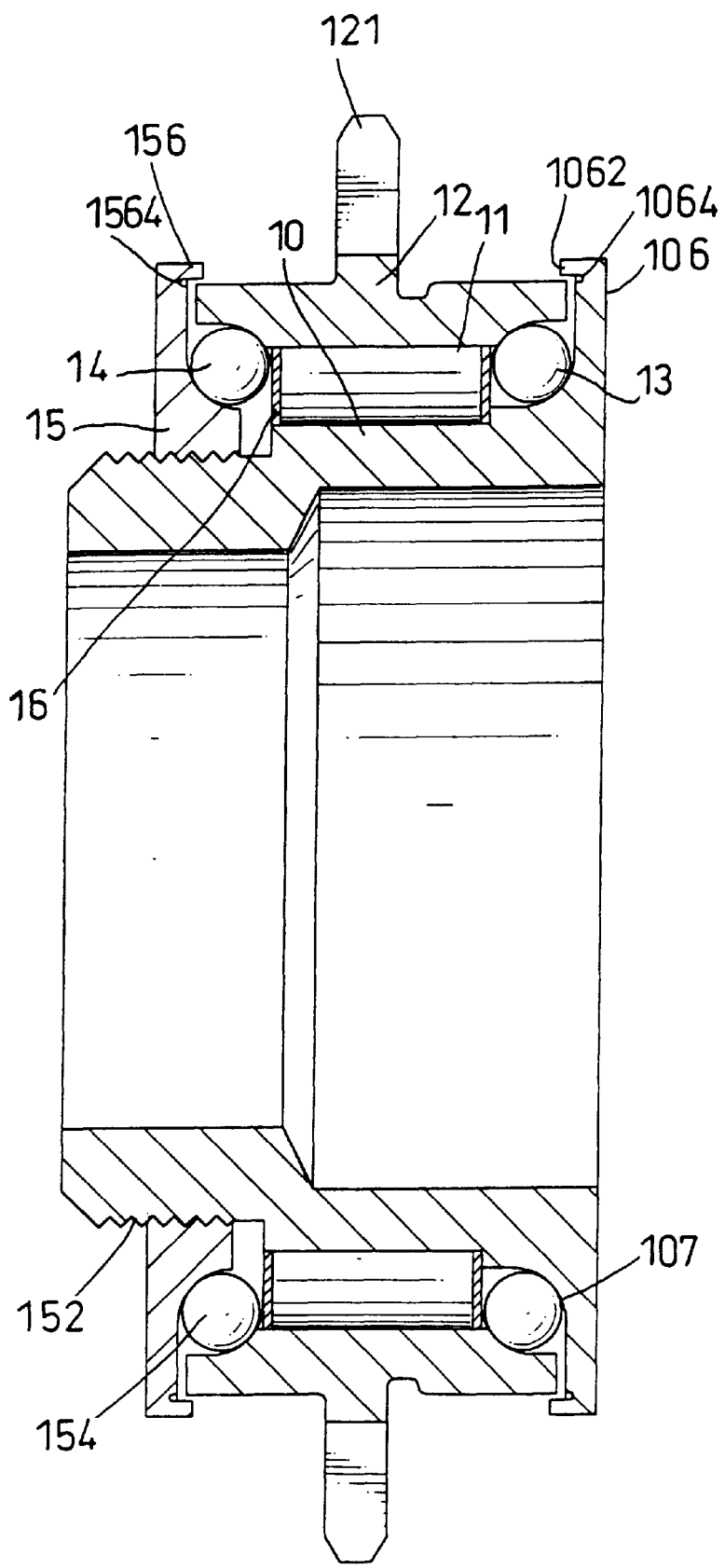
FIG. 5 is a cross-sectional view of a second embodiment of the freewheel sprocket for a bicycle as shown in FIG. 1.
Figure 6:
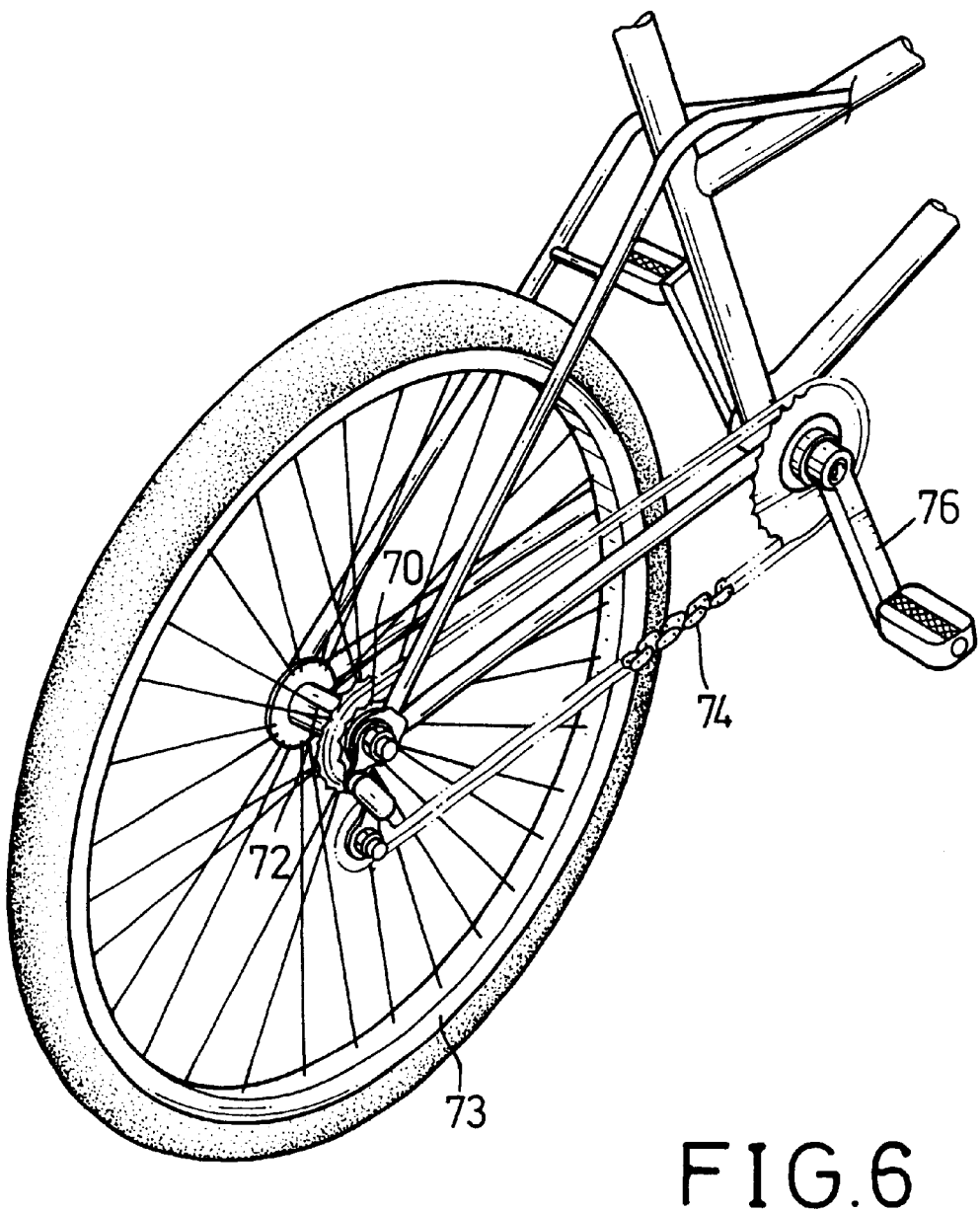
FIG. 6 is a perspective view of a rear of a bicycle showing a prior art freewheel sprocket.
Figure 7:
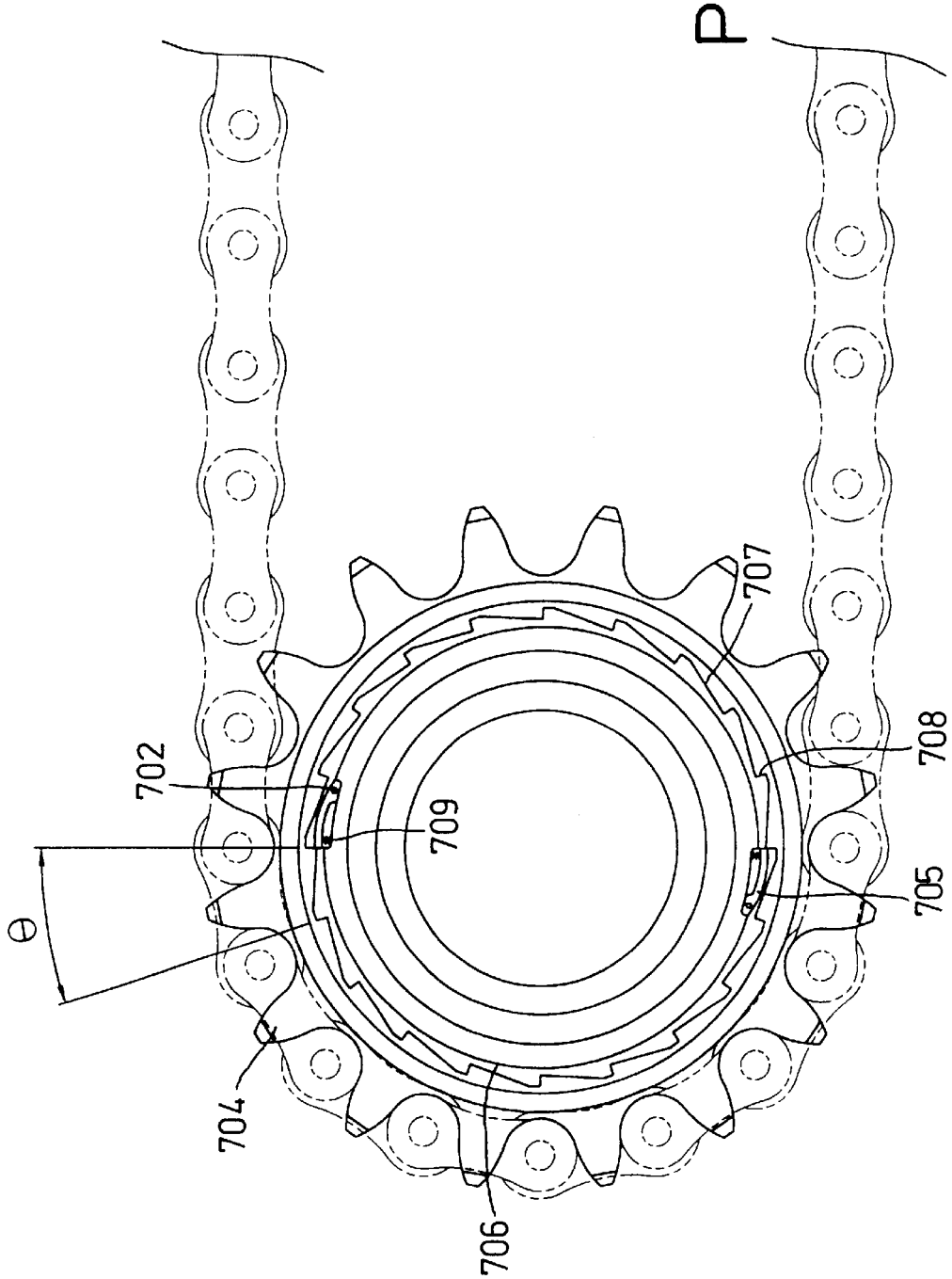
FIG. 7 is a side view of the prior art freewheel sprocket and chain shown in FIG. 6.

In a second embodiment of the invention, as shown in FIG. 5, the flange (106) has a circumferential lip (1062) formed on a side face thereof facing the central portion (102). The lip (1062) has an inner diameter slightly larger than and partly extending over a respective one of the shoulders (123) of the sprocket wheel (12) such that a third seal against foreign matter reaching the bearings (11, 13, 14) etc. The disk clamp (15) has a lateral rim (156) slightly larger than and partly extending over the other shoulder (123) of the sprocket wheel (12) such that a fourth seal against foreign matter reaching the bearings (11, 13, 14) etc. Additionally, ring grooves (1064, 1564) are optionally defined in respective inner faces of the flange (106) and the disk clamp (15) to provide a fifth and sixth seal against foreign matter reaching the bearings (11, 13, 14), wherein grease received in the ring grooves (1064) traps dust, grit, etc.

The freewheel assembly for a bicycle in accordance with the present invention has the following advantages:

(i) uniform distribution of torque transmitted therethrough. The plurality of roller bearings evenly-distributed around the body ensures good distribution of torque transmitted from the sprocket wheel to the body;

(ii) reliability of driving engagement: the plurality of roller bearings means that even if one roller bearing should not move accordingly between the driving and non-driving modes, the remainder of the roller bearings can more than adequately cope with the increased load;

(iii) reliability of transition between the driving and non-driving modes: The shallow and deep ends of the cut outs, and the strip springs provide effective movement of the roller bearings from the driving mode to the non-driving mode, and vice-versa;

(iv) low maintenance operation. The six seals against foreign matter provide effective barriers whereby the freewheel assembly can have a long work life with a minimum of maintenance; and (v) good positional placement: The first and second pluralities of ball bearings ensure that the roller bearings, sleeve, sprocket and body are kept in correct alignment at all times.

Although the present invention has been explained in relation to its preferred embodiment, it is to be understood that many other possible modifications and variations can be made without departing from the spirit and scope of the invention as hereinafter claimed.

What is claimed is:

1. A freewheel assembly for attachment between a wheel and a transmission device of a bicycle such that in a driving mode of the freewheel assembly the transmission device is drivingly connected with the wheel of the bicycle, and in a non-driving mode of the freewheel assembly the transmission device is not drivingly connected with the wheel of the bicycle, the freewheel assembly comprising:

a body (10) having a central portion (102), a threaded end (104) formed at one side of the central portion (102), a flanged portion (106) formed at another side of the central portion (102), a first radius (107) formed at a junction of the flanged portion (106) and the central portion (102), a lip (1062) formed on the flanged portion (106) and a through hole (108) extending from the flanged portion (106) to the threaded end (104);

a sprocket wheel (12) mounted over the central portion (102) of the body (10) and having a toothed center (121) with two plain shoulders (123) respectively formed on two opposed sides of the toothed center (121) and a part of a respective one of the two plain shoulders (123) being covered by the lip (1062), a bore (122) defined by a periphery formed with a plurality of inclined cutouts (124), each of the cutouts (124) having a shallow end (126) and a deep end (125), and two radiused counter bores (127, 128) defined respectively on two opposed sides of the bore (122);

a sleeve (16) received between the central portion (102) of the body (10) and the bore (122) of the sprocket wheel (12), and having a plurality of recesses (162) defined in an outer periphery thereof and corresponding to the plurality of inclined cutouts (124) of the sprocket wheel (12);

a plurality of roller bearings (11) corresponding to the inclined cutouts (124) of the sprocket wheel (12) and rotatably received therein, the roller bearings (11) each having a diameter bigger than a distance between a periphery of the central portion of the body (10) to a top face of the shallow end (126) of each of the inclined cutouts (124) and smaller than a distance between the periphery of the central portion of the body (10) and a top face of the deep end (125) of each of the inclined cutouts (124);

a disk clamp (15) defining a treaded hole (152) engageable with the threaded end (104) of the body (10), and a second radius (154) formed on an inner face thereof;

a plurality of first bearings (13) received between the first radius of the body (107) and the first radiused counter bore (127) of the sprocket wheel (12); and a plurality of second bearings (14) received between the second radiused counter bore (128) of the sprocket wheel (12) and the second radius (154) of the disk clamp, wherein when the roller bearings (11) move to the respective shallow ends (126) of the inclined cutouts (124) in the driving mode, the sprocket wheel (12) is drivingly engaged with the body (10), and when the roller bearings (11) move to the respective deep ends (125) of the inclined cutouts (124), the sprocket wheel (12) is disengaged from the body (10).

2. The freewheel assembly for a bicycle as claimed in claim 1, wherein a resilient member (164) is formed at a rear of each recess (162) of the sleeve (16), whereby a corresponding one of the roller bearings (11) received therein is urged towards the deep end (125) of the recess (124), whereby the freewheel assembly is biased to the non-driving mode.

3. The freewheel assembly as claimed in claim 1, wherein the sleeve (16) is made from plastics.

4. The freewheel assembly as claimed in claim 3, wherein the plastics is polyethylene.

5. The freewheel assembly as claimed in claim 1, wherein the disk clamp (15) has a rim (156) formed to extend over a part of the respective shoulder (123) of the sprocket wheel (12), whereby foreign matter is prevented from contaminating the roller bearings (11), the first bearings (13), and the second bearings (14).

6. The freewheel assembly as claimed in claim 1, wherein an inner face of the flange (106) of the body (10) defines a circular groove (1064) receiving grease therein, whereby foreign matter is trapped in the grease and prevented from contaminating the roller bearings (11), the first bearings (13), and the second bearings (14).

7. The freewheel assembly as claimed in claim 1, wherein the inner face of the disk clamp (15) defines a second circular groove (1564) receiving grease therein, whereby foreign matter is trapped in the grease and prevented from contaminating the roller bearings (11), the first bearings (13), and the second bearings (14).

8. The freewheel assembly as claimed in claim 1, wherein the sprocket wheel (12) has two lateral steps (1232) respectively extending from the shoulders (123) to partly cover a periphery of the flange (106) and a periphery of the disk clamp (15), whereby foreign matter is prevented from contaminating the roller bearings (11), the first bearings (13), and the second bearings (14).

9. The freewheel assembly as claimed in claim 1, wherein the first and second bearings (13, 14) are ball bearings.

* * * * *